United States Patent [19]

Newby

[11] Patent Number: 4,745,707
[45] Date of Patent: May 24, 1988

[54] PLANT POT ASSEMBLY

[76] Inventor: John Newby, 41289 Malcolmson St., Fremont, Calif. 94538

[21] Appl. No.: 870,341

[22] Filed: Jun. 4, 1986

[51] Int. Cl.[4] .............................................. A01G 25/00
[52] U.S. Cl. .......................................... 47/79; 47/48.5
[58] Field of Search ....................... 47/79, 80, 48.5, 71

[56] References Cited

U.S. PATENT DOCUMENTS

| | | | |
|---|---|---|---|
| 1,251,552 | 1/1918 | Marks | 47/80 |
| 2,238,132 | 4/1941 | Ritter | 47/80 |
| 2,344,794 | 3/1944 | Vallinos | 47/80 |
| 2,807,912 | 10/1957 | Bjorksten | 47/58 |
| 2,950,567 | 8/1960 | Newman | 47/17 |
| 4,001,967 | 1/1967 | Swift et al. | 47/80 |
| 4,083,147 | 4/1978 | Garrick | 47/80 |
| 4,125,963 | 11/1978 | Johnson | 47/79 |
| 4,133,141 | 1/1979 | Lee | 47/79 |
| 4,173,098 | 11/1979 | Smith | 47/80 |
| 4,178,715 | 12/1979 | Greenbaum | 47/79 |
| 4,315,599 | 2/1982 | Biancardi | 239/10 |

FOREIGN PATENT DOCUMENTS

| | | | |
|---|---|---|---|
| 2447230 | 4/1976 | Fed. Rep. of Germany | 47/80 |
| 1477854 | 4/1967 | France | 47/80 |
| 876944 | 9/1961 | United Kingdom | 47/80 |

Primary Examiner—Robert A. Hafer
Assistant Examiner—Bradley M. Lewis

[57] ABSTRACT

A plant pot assembly characterized by a container covered by a substantially impermeable cover such that water may be drawn upwardly through a capillary space between the covering and the container to irrigate a plant disposed within the container. The assembly also includes an outer enclosure which distills irrigation water, and which further aerates the growing medium within the container by forcing vapor saturated air into the medium. Due the combination of a capillary pumping action and an evaporation/condensation cycle, the plant pot assembly provides continuous irrigation for a plant at most ambient temperatures.

12 Claims, 3 Drawing Sheets

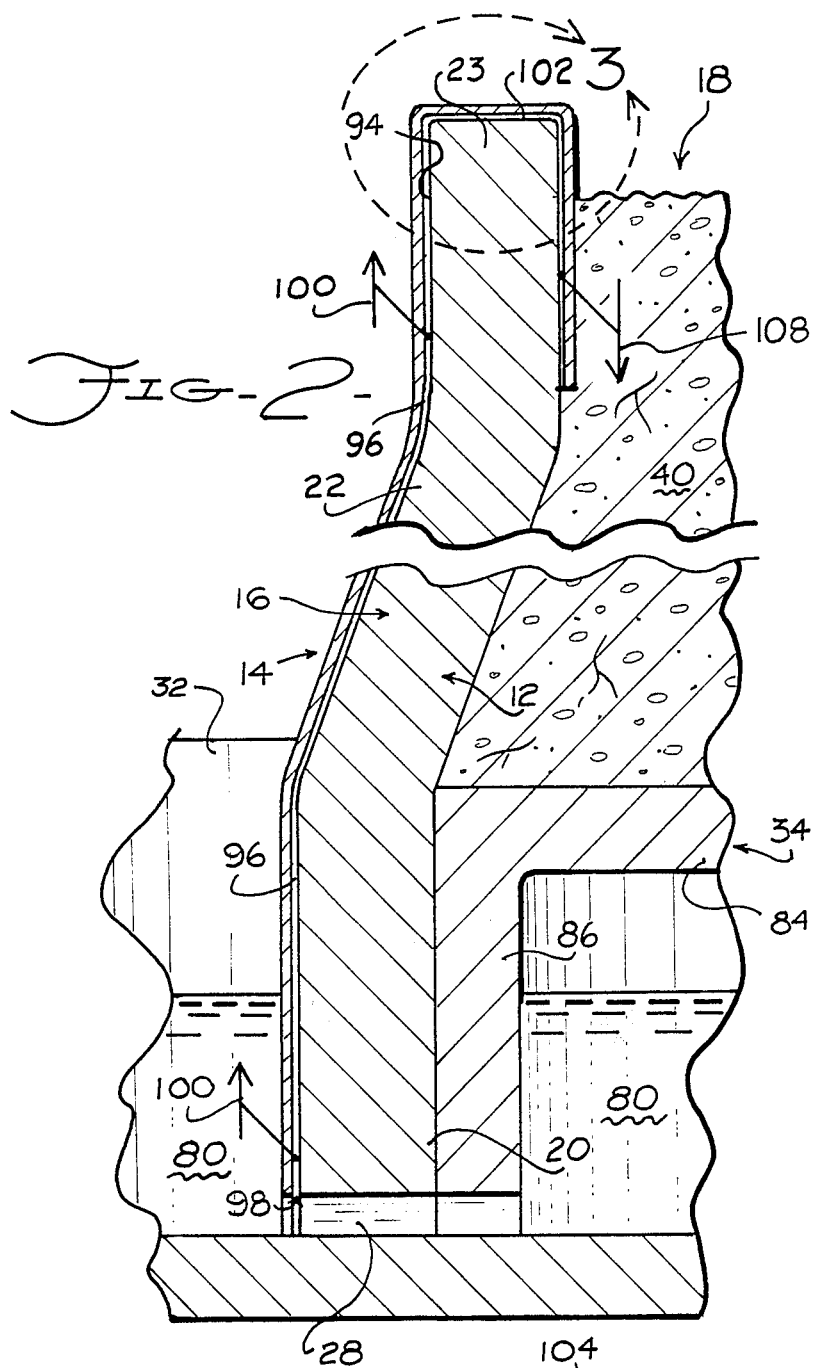
*Fig-2-*
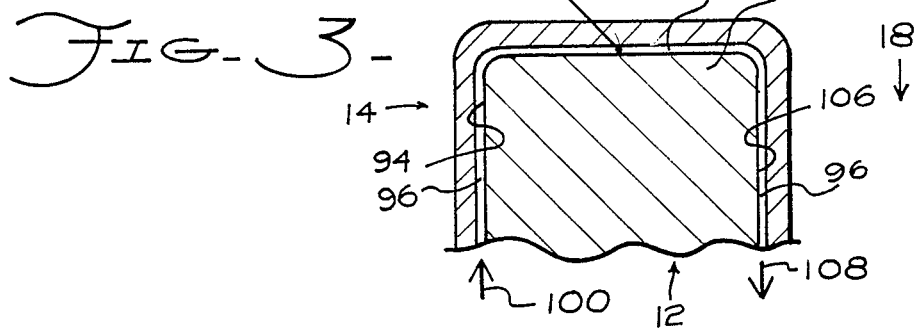
*Fig-3-*

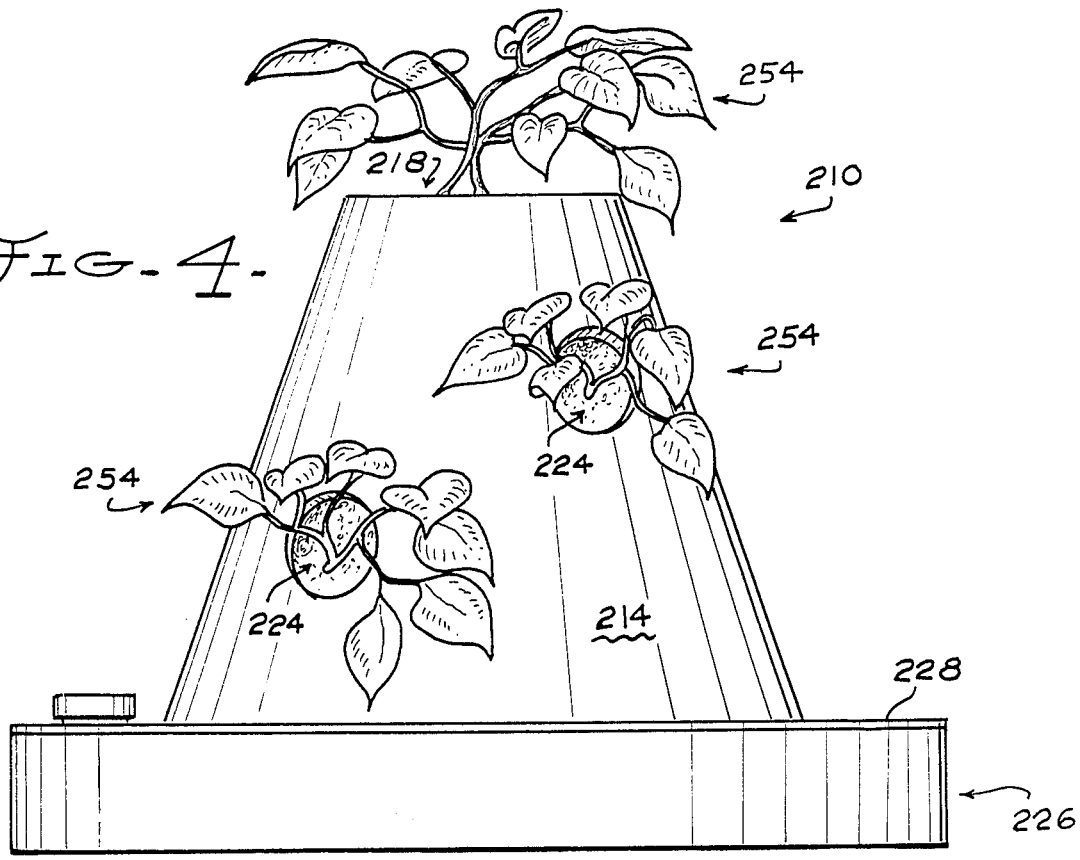
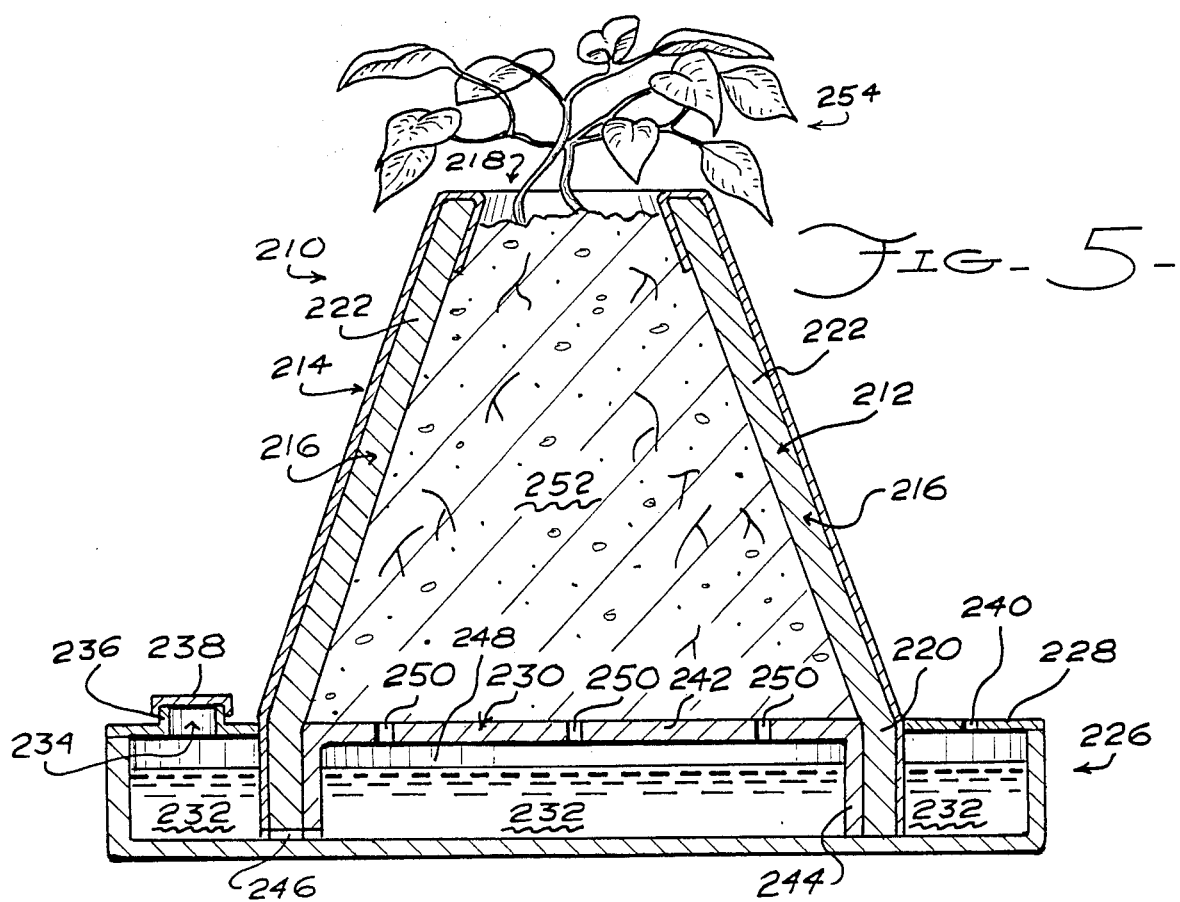

PLANT POT ASSEMBLY

BACKGROUND OF THE INVENTION

1. Field of the Invention

This invention relates generally to plant pots, and more particularly to self-watering plant pots.

2. Description of the Prior Art

Potted plants must be watered regularly if they are to survive and grow. Unfortunately, many people neglect to properly water their plants.

Due to this problem, a number of prior art plant pots are designed to automatically water the plants which they contain. For example, U.S. Pat. No. 2,950,567 of Newman teaches a plant pot placed within a closed terrarium where water vapor condenses along the top and sides of the terrarium and is directed back to the pot by a number of conduits.

In U.S. Pat. No. 4,125,963 of Johnson, a self-watering plant box is disclosed including a semi-spherical bowl for containing dirt, and a conical tower attached over the bowl which has a water reservoir and a number of condensation plates. Water vapor from the reservoir condenses on the condensation plates and drips into the dirt below In U.S. Pat. No. 4,178,715 of Greenbaum an irrigation assembly includes an array of V-shaped, soil containing channels in a side-by-side relationship. The array is placed on a base over which a contaminated water, such as seawater, flows. Water vapor from the seawater permeates through apertures provided in the channels to moisten the soil within the V-shaped channels. The portion of the array in contact with the seawater is liquid impermeable, and zones beneath the V-shaped channels where water vapor is present is vented to the atmosphere through apertures in end plates of the array. Due to the venting of the zones beneath the V-shaped channels, there is not a pressure differential between the zones and the interior of the channels As a result, air is not forced into the interior of the V-shaped channels to aerate the soil. Furthermore, because of the lack of a pressure differential, water vapor is not efficiently forced into the soil.

In U.S. Pat. Nos. 4,133,141 of Lee and No. 4,173,098 of Smith, self-watering plant pots are disclosed in which a barrier separates a section filled with dirt from a section filled with water. Other examples of self-watering plant pots can be found in U.S. Pat. No. 4,083,147 of Garrick, No. 4,001,967 of Swift et al., No. 2,807,912 of Bjorksten, and No. 4,315,599 of Biancardi.

As mentioned previously, the prior art does not address the problem of root aeration. If a plant is overwatered, air pockets within the soil are saturated which deprives the plant roots of oxygen. With self-watering plant pots which continuously recycle water, root asphyxiation becomes a major problem.

A drawback of many prior art self-watering plant pots is that they are not closed systems. Thus, in devices such as those disclosed in Johnson and Smith, the plant pots must frequently be refilled with water.

A drawback of prior art self-watering plant pots which operate on an evaporation/condensation cycle is that they can only operate efficiently when the ambient temperature is high enough to vaporize large quantities of water. Many such plant waterers therefore do not provide sufficient water to keep the plants alive during extended cool or cold periods

SUMMARY OF THE INVENTION

An object of this invention is to provide a self-watering plant pot which operates efficiently at both high and low temperatures.

Another object of this invention is to provide a self-watering plant pot which can use contaminated water to irrigate a plant.

Briefly, the plant pot assembly includes a container having a substantially contiguous sidewall and an upwardly opening mouth, and a liquid impermeable covering which covers the outer sidewall surfaces of the container. The covering is loosely applied to the sidewalls of the container to provide a capillary space so that liquids can be drawn from the base of the container to the mouth of the container within the capillary space. Preferably, the covering extends over the lip of the container and into its mouth.

The plant pot assembly also preferably includes an outer enclosure surrounding the container and the covering to provide a sealable evaporation volume. As the plant pot assembly absorbs heat, a pressure differential is created between the sealed evaporation volume and the interior of the container which forces water vapor and air from the evaporation volume into the interior of the container. This action simultaneously aerates the growing medium within the container, and forces water vapor deep into the growing medium under pressure.

The plant pot assembly further preferably includes a collection tray located within the enclosure and adapted to collect fluid runoff from the covering of the container and from an inclined condensation surface of the enclosure. The fresh runoff water may be derived from contaminated water, such as seawater.

An advantage of this invention is that it operates effectively both at high and low temperatures. At high temperatures, the evaporation/condensation cycle forces air and water vapor into the interior of the container, and creates the supply of fresh water within the collection tray. At both high and low temperatures, fresh water is drawn from the collection tray into the capillary space between the container and the covering and is released into the mouth of the container for top-down watering.

These and other objects and advantages of the present invention will no doubt become apparent upon a reading of the following descriptions and a study of the several figures of the drawing.

BRIEF DESCRIPTION OF THE DRAWING

FIG. 2 is an enlarged, cross sectional view of a portion of FIG. 1;

FIG. 3 is an enlarged, cross sectional view of the encircled portion in FIG. 2;

FIG. 4 is a front elevational view of an alternate embodiment of the present invention; and FIG. 5 is a cross-sectional view of FIG. 4.

DETAILED DESCRIPTION OF THE PREFERRED EMBODIMENT(S)

Figure 1:
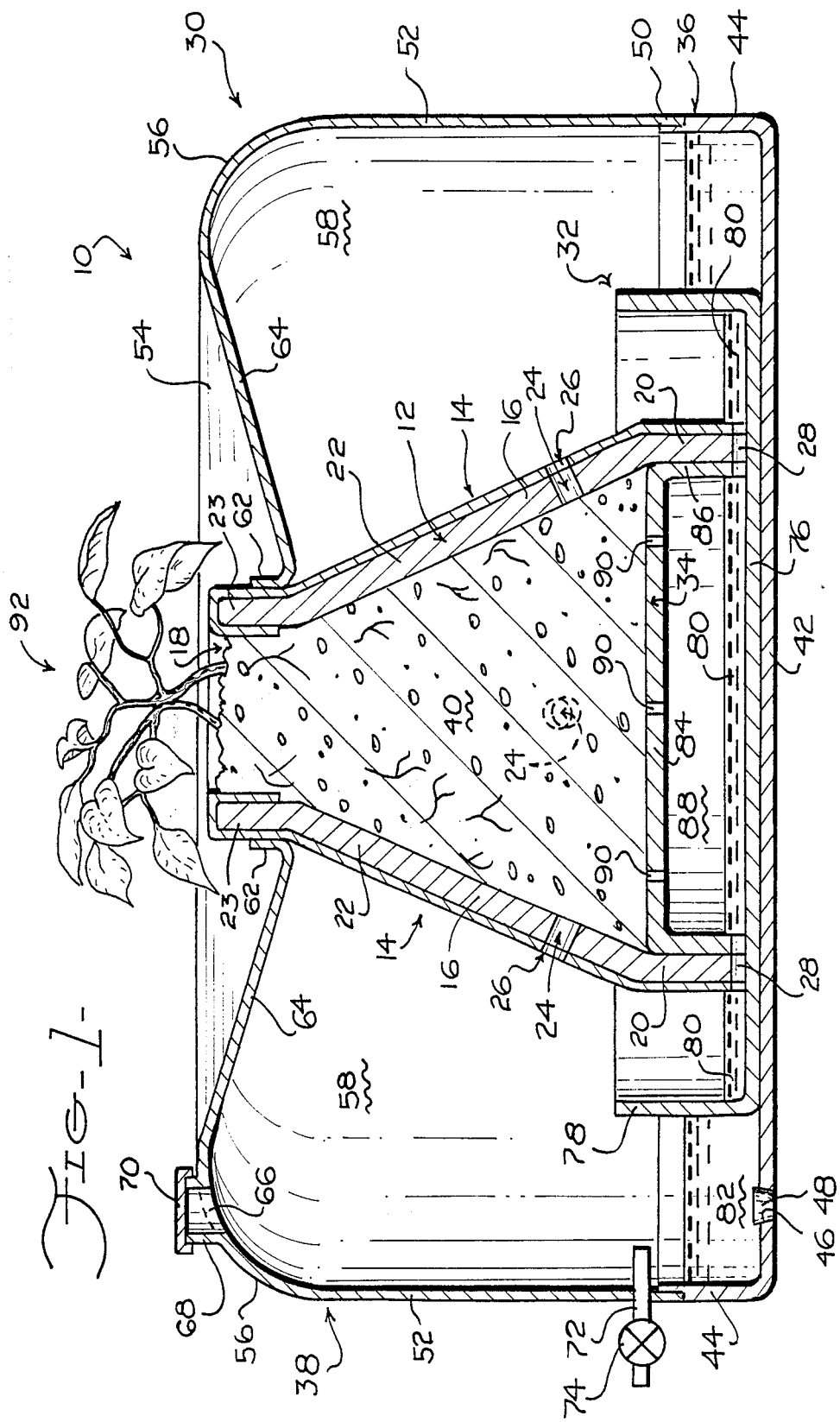
FIG. 1 is a cross sectional view of a plant pot assembly in accordance with the present invention.

Referring to FIG. 1, a plant pot assembly 10 in accordance with the present invention includes a container 12 and a covering 14. Container 12 has substantially contiguous sidewalls 16 and an upwardly opening mouth 18. Sidewalls 16, which are preferably made from a porous material such as clay include a substantially cylindrical foot portion 20, an upwardly tapering conical portion 22, and a substantially vertical lip portion 23. A plurality of apertures 24 are provided through the conical portions 22 and through aligned apertures 26 of covering 14. Foot portion 20 is further provided with apertures 28 for purposes to be discussed subsequently.

Covering 14 is preferably made from a material which is substantially impermeable to liquids, such as any one of a number of plastics. The material of covering 14 may be transparent or opaque. Covering 14 may, for example, be made from a flexible plastic material which is loosely draped over sidewalls 16. Alternatively, covering 14 may be made from a rigid material which is formed to be closely separated from the sidewalls 16 of container 12. In either embodiment, a small, capillary space is operationally provided between covering 14 and the outer surface of sidewalls 16. Of course, if the covering 14 is flexible it may be in actual contact with sidewalls 16 at certain points. Having the flexible or inflexible covering 14 contact areas of sidewalls 16 is not fatal, however, as long as there is sufficient capillary space between the two to permit capillary pumping.

The plant pot assembly 10 further includes an outer enclosure 30, a collection tray 32, and a platform 34. As will be discussed in greater detail subsequently, outer enclosure 30, collection tray 32, and platform 34 cooperate to irrigate and aerate growing medium 40 disposed within container 12.

Outer enclosure 30 includes a base 36 and a cover 38. Base 36 includes a bottom 42 and sidewalls 44. Bottom 42 may be provided with a drain hole 46 which can be plugged by a removable plug 48. A shoulder portion 50 is provided near the upper edge of sidewalls 44 to provide an engagement surface for the bottom edge of cover 38.

Cover 38 includes contiguous sidewall portions 52 and a top portion 54. Cover 38 may be made from a material which is either transparent or opaque. Sidewall portions 52 merge smoothly with top portion 54 at shoulders 56. Cover portions 38, in cooperation with base portion 36, forms an evaporation volume 58. Top portion 54 has an inverted, conical shape which terminate with flanges 62 to form a tight seal against covering 14 at lip portion 23. The internal surface of top portion 54 provides a condensation surface 64, the purpose of which will be discussed in greater detail subsequently. Cover 38 is further provided with a filler hole 66, a filler neck 68 rising from shoulder 56, and a filler cap 70 to seal filler hole 66.

An optional overflow tube 72 and a valve 74 prevent the overfilling of base 36. More specifically, when valve 74 is opened and when fluid is being poured into filler holes 68, fluid within base 36 can rise no higher than overflow tube 72, and thus will not flow into collection tray 32 to possibly contaminate the fluid stored therein. In normal operation, however, valve 74 is closed so that the evaporation volume 58 remains sealed from the ambient environment.

Collection tray 32 is an upwardly opening tray having a bottom 76 and sidewalls 78. The purpose of collection tray 32 is to collect fresh runoff fluid 80 and to separate it from possibly contaminated fluid 82 in base portion 36. The fluid 80 within collection tray 32 can flow through apertures 28 in platform 34 to provide a large reservoir.

Platform 34 preferably closely fits within foot portion 20 of conatiner 12, and i ncludes a top 84 and sidewalls 86. The sidewalls 86 are provided with the apertures 28 to permit fluid 80 to flow in and out of the volume 88 beneath top 84. Vents 90 are provided in top 84 to permit excess fluids to drain from gowing medium 40 into collection tray 32, and to permit air and vapor within volume 88 to expand into the growing medium 40 as the fluid level 80 rises, providing further aeration and irrigation of the growing medium.

Plant pot assembly 10 is used by first filling the interior of container 12 with growing medium 40 and then planting an item such as plant 92. Filler cap 70 is removed and overflow valve 74 is opened so that fluid 82 can be poured into base 36 of outer enclosure 30. As explained previously, overflow tube 72 prevents the fluid 82 from overflowing sidewalls 78 of collection tray 32, and thus possible contaminating runoff fluid 80. The fluid 82 can be fresh water, or it can be contaminated water such as seawater. Base 36 can be drained by removing plug 48 from drain hole 46.

Once a quantity of fluid 82 has been poured into base 36, the evaporation volume 58 is sealed from external influence by replacing filler cap 70 on filler neck 68, and by closing overflow valve 74. As the plant pot assembly 10 becomes heated by radiative, conductive, or convective heat sources, the air and gases within evaporation volume 58 expand to a pressure which is greater than that of the ambient emvironment. Therefore, a pressure differential is created between evaporation volume 58 and the interior of container 12.

A certain amount of vapor will also evaporate from fluids 82 and 80 to fill the evaporation volume 58. Also, a portion of the vapor within evaporation volume 58 will condense on condensation surface 64 and on the outer surface of covering 14. Vapor which condenses on condensation surface 64 tends to run down the surface to become deposited on covering 14. Also, condensed water vapor on covering 14 tends to run down its tapered surface and into collection tray 32 to provide runoff fluid 80. Finally, a certain quantity of the runoff fluid on covering 14 will flow through apertures 26 and 24 to provide direct irrigation for the growing medium 40.

Since the fluid 80 is mostly comprised of runoff from condensation surface 64 and covering 14, it remains a relatively fresh irrigation source regardless of the degree of contamination of the fluid 82. Even when the temperature of plant pot assembly 10 is insufficient to vaporize much water vapor into evaporation volume 58, fluid 80 is still available for irrigating the growing medium 40 via capillary pumping action, as will be discussed in greater detail subsequently with regards to FIGS. 2 and 3.

The combination of the outer enclosure with the collection tray 32 and platform 34 serves several purposes. Firstly, the outer enclosure 30 provides the evaporation volume 58 which allows a pressure differential to be created that forces air and water vapor under pressure into the growing medium 40 through apertures 24 and 26 and vents 90. Furthermore, the outer enclosure 30 permits relatively clean, runoff water to be produced from brackish, saline, or otherwise contaminated water, which can be both directly supplied to the growing medium through apertures 24 and 26, and can further be stored within collection tray 32 for future use.

The plant pot assembly 10 of the present invention also serves to irrigate the growing medium 40 through an entirely different mechanism, namely through the aforementioned capillary pumping action. The capillary pumping action operates at both high and low temperatures, and therefore supplements the evaporation/condensation cycle previously described at higher temperatures, and provides the majority of the irrigation at temperatures too low to vaporize large quantities of water.

Referring now to FIGS. 2 and 3, the covering 14 is operationally separated from an outer surface 94 of sidewalls 16 by a small, capillary space 96. Fluid 80 enters the capillary space 96 through openings 98 near aperture 28 and travels upwardly along outer surface 94 of sidewalls 16 as indicated by arrows 100. Once the water within capillary space 96 reaches the top of lip portion 23, it rounds the top 102 of lip portion 23 as indicated by arrow 104. It then drains down the inner surface 106 of sidewalls 16 and drains into mouth 18 as indicated by arrow 108. Thus, irrigation water is constantly drawn from collection tray 32 and deposited into the mouth of container 12 to provide top-down watering of the growth medium 40.

Preferably, the container 12 is made from a porous material, such as clay, which also draws water upwardly by capillary action until it is saturated. While the water drawn upwardly through the sidewalls 16 of the container 12 is not sufficient to irrigate the medium 40, it does provide a mechanism for increasing the humidity and therefore moisture content of the medium in the proximity of sidewalls 16.

Since the capillary pumping action between the covering 14 and sidewalls 16 of container 12 continues at even relatively cool temperatures, the plant 92 is always ensured of an adequate water supply. At higher temperatures, the evaporation/condensation process also serves to provide moisture and aeration, and permits fluid 80 to be stored within collection tray 32.

Referring now to FIGS. 4 and 5, an alternate embodiment for a plant pot assembly 210 includes a container 212 and a covering 214. Container 212 has substantially contiguous sidewalls 216 and an upwardly opening mouth 218. Sidewalls 216 include a substantially cylindrical foot portion 220 and a conical portion 222. A plurality of apertures 224 are provided through covering 214 and sidewalls 216.

Covering 214 is, as was the case in the previous embodiment, preferably made from a substantially liquid impermeable material. Again, covering 214 is operationally separable from the outer surface of outer sidewalls 216 to provide a capillary space therebetween. However, covering 214 is also preferably attached to the sidewalls 216 in the vicinity of apertures 224 to prevent the loss of moisture at the apertures.

Plant pot assembly 210 also includes a collection tray 226, a collection tray lid 228, and a platform 230. Collection tray 226 is adapted to contain a reservoir of fluid 232. Collection tray lid 228 is provided with a filler hole 234, a filler neck 236, and a filler neck cap 238. Preferably, lid 228 is provided with a least one vent hole 240.

Platform 230 closely fits within foot portion 220 an includes a top 242 and sidewalls 244. The sidewalls 244 are provided with apertures 246 which, in cooperation with similar apertures in container 212 and covering 214, permit fluid 232 to flow in and out of the volume 248 beneath top 242. Vents 250 are provided in top 242 to permit excess fluids to drain from the growing medium 252 into collection tray 226, and to permit air and vapor within volume 248 to expand into the growing medium 40 as the fluid level 232 rises.

In operation, a plant or plants 254 is planted within growing medium 252 such that stalks and branches thereof may extend from mouth 218 and/or apertures 224. Cap 238 is removed from filler neck 236 to permit water, fertilizer, etc. to be poured into collection tray 226. The resultant fluid 232 is drawn, by capillary action, upwardly between the outer surface of container 212 and the inner surface of covering 214 and deposited into the mouth 218 of container 212 as was described in greater detail with reference to the previous embodiment.

While this invention has been described in terms of a few preferred embodiments, it is contemplated that persons reading the preceding descriptions and studying the drawing will realize various alterations, permutations and modifications thereof. For example, if vents 240 were not provided in lid 228, air and moisture in volume 248 can be forced into growing medium 252 through vents 250 as the air enclosed by collection tray 226 and lid 228 expands. It is therefore intended that the following appended claims be interpreted as including all such alterations, permutations and modifications as fall within the true spirit and scope of the present invention.

What is claimed is:

1. A plant pot assembly comprising:
   a growth medium container having substantially contiguous upwardly tapering sidewalls and an upwardly opening mouth to define a truncated conical contour, said container made of a porous material, said sidewalls terminating in a lip portion at said mouth,
   covering means made from a material which is substantially impermeable to liquids, said covering means having an inner surface following the contour of at least the majority of the outer surface of said sidewalls, where said covering means is operationally separated from said outer sidewall surfaces to form a capillary space therebetween, said covering means extending over said lip portion of the container and entering said mouth, whereby liquids can be drawn upwardly within said capillary space and released into said mouth of said container, and
   a collection tray below said container and in fluid communication with said capillary space, said container having at least one aperture providing fluid communication between the inside surfaces of the container sidewalls and the collection tray.

2. A plant pot assembly as recited in claim 1 further comprising an outer enclosure surrounding major portions of said container and said covering means, said enclosure having a condensation surface which inclines towards said outer surface of said sidewalls, said mouth of the container exposed to the exterior of the outer enclosure.

3. A plant pot assembly as recited in claim 2 wherein said enclosure is sealed to said container and said covering means to provide a sealed evaporation volume within said enclosure.

4. A plant pot assembly as recited in claim 3 wherein said sidewalls of said container and said covering means are provided with apertures which permit gas, vapor, and other fluids to flow between said evaporation volume and an interior volume of said container due to pressure differentials therebetween, whereby vapor saturated air may be forced, under pressure, into said interior volume from said evaporation volume to provide both irrigation and aeration.

5. A plant pot assembly as recited in claim 4 wherein said enclosure includes a base portion adapted to contain a supply of irrigation fluid.

6. A plant pot assembly as recited in claim 5 wherein said collection tray overlies said base portion of said enclosure, said collection tray being adapted to collect fluid runoff from said covering means and said condensation surface, whereby said supply of irrigation fluid and said fluid runoff are separated by wall portions of said collection tray.

7. A plant pot assembly as recited in claim 6 further comprising a platform disposed within said interior volume of said container having a support surface for supporting growing medium, where said platform, said container, and said covering means permit fluid communicaton between said collection tray and a volume beneath said support surface of said platform.

8. A plant pot assembly as recited in claim 1 wherein said container is made from a porous material, whereby fluids may be drawing upwardly within said sidewalls of said container by capillary action.

9. A plant pot assembly comprising,
a porous growth medium container having an upwardly tapering sidewall and an upwardly opening mouth defining a truncated conical contour, said sidewall terminating in a lip portion at said mouth,
a collection tray positioned below said porous container for the collection of liquid, said collection tray being in fluid communication with said container,
a platform wall spaced apart from the collection tray and attached to the lower portion of said sidewall of the container to define a container interior above said platform wall, said platform wall having at least one platform aperture therethrough,
a covering having a contour substantially identical to the truncated conical contour of said container, said covering spaced apart from said container to form a capillary space in fluid communication with said collection tray, said covering extending over said lip portion of the container and entering said mouth, said covering made of a material impermeable to liquid, said sidewall of the container and said covering having coinciding side apertures therethrough, and
an airthight enclosure encasing at least the major portion of said sidewall of the container to define an evaporation volume, said mouth of the container extending above the enclosure, said enclosure being in fluid communication with said collection tray and with said side apertures of the container sidewall and the covering, whereby vapor saturated air may be forced into the container interior through said side apertures from said evaporation volume and through said platform aperture from said collection tray.

10. The plant pot assembly as recited in claim 9 wherein said airtight enclosure has a condensation surface downwardly inclined toward said sidewalls of the container.

11. The plant pot assembly as recited in claim 9 wherein said airtight enclosure includes a base portion adapted to contain a supply of irrigation fluid, said collection tray spaced apart from said supply of irrigation fluid by a wall.

12. The plant pot assembly as recited in claim 9 wherein the spacing between said platform wall and said collection tray is partially filled with a supply of fluid, the area immediately above said supply of fluid being airtight other than through said platform aperture.

* * * * *